(12) United States Patent
Klassen et al.

(10) Patent No.: US 8,126,976 B2
(45) Date of Patent: Feb. 28, 2012

(54) DELIVERY OF EMAIL MESSAGES IN MULTIPLE PARTS

(75) Inventors: Gerhard Dietrich Klassen, Waterloo (CA); Cheryl Mok, Waterloo (CA); Pavel Shkolnikov, Waterloo (CA); Dimitri Mostinski, Waterloo (CA)

(73) Assignee: Research In Motion Limited, Waterloo (CA)

( * ) Notice: Subject to any disclaimer, the term of this patent is extended or adjusted under 35 U.S.C. 154(b) by 249 days.

(21) Appl. No.: 12/499,973

(22) Filed: Jul. 9, 2009

(65) Prior Publication Data
US 2010/0011075 A1    Jan. 14, 2010

Related U.S. Application Data

(60) Provisional application No. 61/079,376, filed on Jul. 9, 2008.

(51) Int. Cl.
*G06F 13/00* (2006.01)
(52) U.S. Cl. ........................ 709/206; 709/246
(58) Field of Classification Search .......... 709/206, 709/230–236, 246
See application file for complete search history.

(56) References Cited

U.S. PATENT DOCUMENTS

| | | | |
|---|---|---|---|
| 7,003,551 B2 * | 2/2006 | Malik | 709/206 |
| 7,376,702 B2 * | 5/2008 | DeSalvo et al. | 709/206 |
| 7,949,301 B2 * | 5/2011 | Bells et al. | 455/41.2 |
| 7,970,881 B2 * | 6/2011 | Ocampo | 709/223 |
| 2002/0065892 A1 * | 5/2002 | Malik | 709/206 |
| 2003/0093565 A1 | 5/2003 | Berger et al. | |
| 2003/0115272 A1 * | 6/2003 | Muttitt et al. | 709/206 |
| 2003/0212757 A1 | 11/2003 | Niikura et al. | |
| 2005/0125553 A1 | 6/2005 | Wu et al. | |
| 2008/0016359 A1 | 1/2008 | Godfrey et al. | |
| 2008/0125067 A1 | 5/2008 | Bells et al. | |
| 2009/0210502 A1 * | 8/2009 | Ocampo | 709/206 |

FOREIGN PATENT DOCUMENTS

| | | |
|---|---|---|
| WO | 9732408 | 9/1997 |
| WO | 2005026915 | 3/2005 |

OTHER PUBLICATIONS

International Search Report and Written Opinion issued Oct. 19, 2009 in respect of corresponding PCT Application No. PCT/CA2009/000959.
Search Report dated Sep. 11, 2009.

* cited by examiner

*Primary Examiner* — Kenneth R Coulter
(74) *Attorney, Agent, or Firm* — Ridout & Maybee LLP (57) ABSTRACT

A method, server and system for managing the delivery of email messages in multiple parts is provided. A method for sending email messages in multiple parts to a mobile communication device, comprises receiving a request for additional content from a mobile communication device in respect of an email message for which a selected part of the content has been previously sent to the mobile communications device; and determining if processing technology used to provide the previously sent selected part is compatible with currently available processing technology, and if compatible then processing additional content from the email message using the currently available processing technology and sending the processed additional content to the mobile communication device.

11 Claims, 5 Drawing Sheets

DELIVERY OF EMAIL MESSAGES IN MULTIPLE PARTS

This application claims the benefit of and priority to U.S. provisional patent application Ser. No. 61/079,376 filed Jul. 9, 2008, the contents of which are incorporated herein by reference.

TECHNICAL FIELD

The present disclosure relates generally to communication systems and, more particularly to a method, server and system for the delivery of email messages in multiple parts.

BACKGROUND

The file size of email messages may vary widely. Messages may potentially be quite large. In recent years, more widespread usage has been made of emails that include more than just plain text content, such as HyperText Markup Language (HTML) emails. HTML emails can include inline images and other content for display within the body of the email and may include markup describing how the contents of the email should be formatted when displayed. The use of such content has led to even larger sizes of email messages.

The transmission of large emails to mobile communication devices results in a large use of many limited resources. For example, such emails use a large amount of bandwidth and may use a large amount of local storage on the mobile communication device. A large amount of processing power may also be required to render and display emails of a large size.

Thus, there exists a need for methods, servers and systems for optimizing the delivery of large email messages.

BRIEF DESCRIPTION OF THE DRAWINGS

Like reference numerals are used in the drawings to denote similar elements and features.

DETAILED DESCRIPTION OF EXAMPLE EMBODIMENTS

A method, server and system for managing the delivery of email messages in multiple parts is provided. According to one example embodiment a method for sending email messages in multiple parts to a mobile communication device includes receiving a request for additional content from a mobile communication device in respect of an email message for which a selected part of the content has been previously sent to the mobile communications device. A determination is then made if processing technology used to provide the previously sent selected part is compatible with currently available processing technology, and if compatible then additional content from the email message is processed using the currently available processing technology. The processed additional content is then sent to the mobile communication device. If compatible processing technology is not available, an indication of incompatibility is sent to the mobile communication device. Such a method can be useful for example if a mobile email server upgrade has occurred between sending of the initial part of an email message and a subsequent portion of an email message to a mobile communication device.

Figure 1:
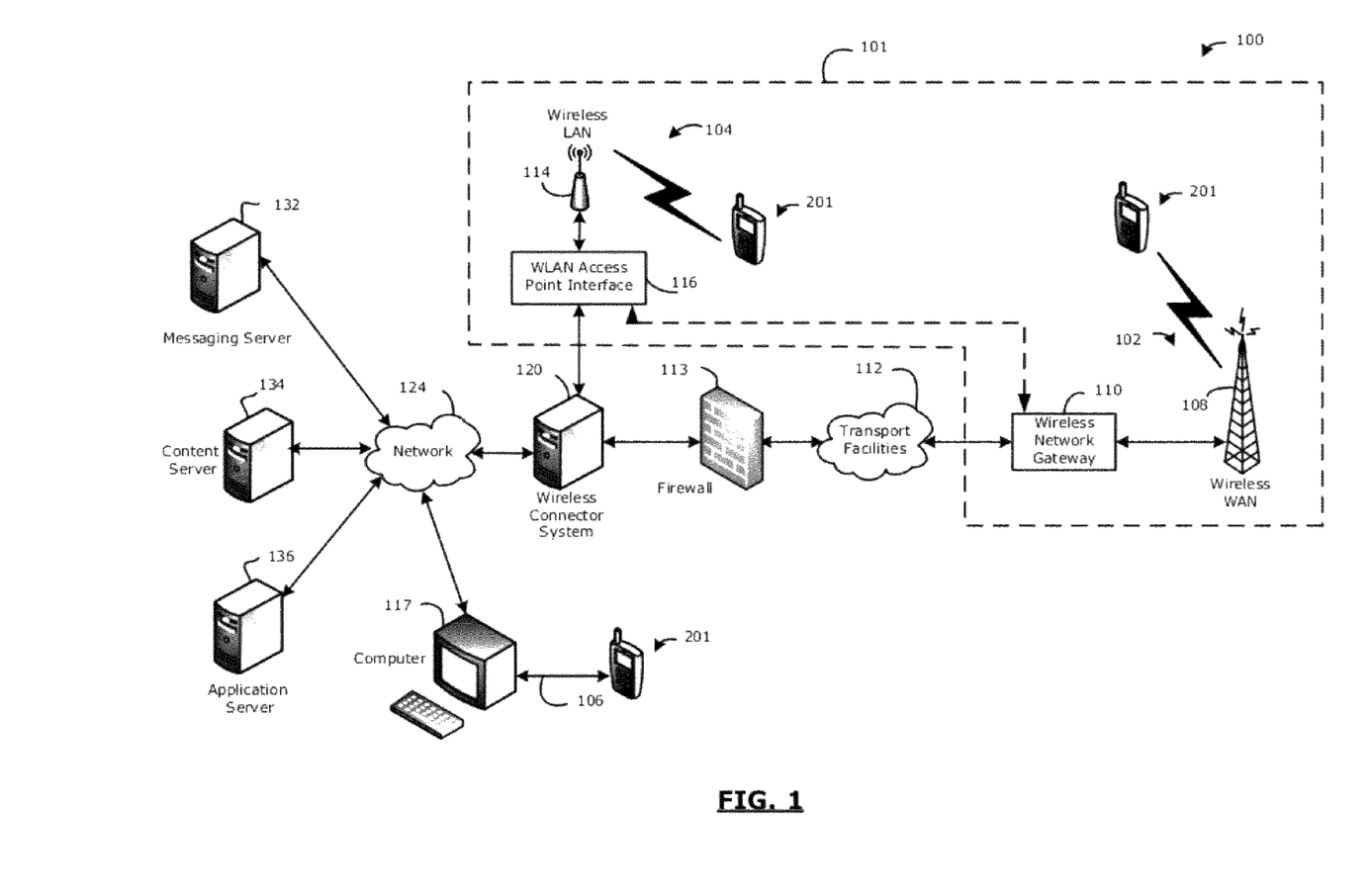
FIG. 1 is a block diagram illustrating a communication system including a mobile communication device to which system example embodiments of the present disclosure can be applied.

In order to facilitate an understanding of one possible environment in which example embodiments described herein can operate, reference is first made to FIG. 1 which shows in block diagram form a communication system 100 in which example embodiments of the present disclosure can be applied. The communication system 100 comprises a number of mobile communication devices 201 which may be connected to the remainder of the system 100 in any of several different ways. Accordingly, several instances of mobile communication devices 201 are depicted in FIG. 1 employing different example ways of connecting to system 100. Mobile communication devices 201 are connected to a wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), WiMax (Worldwide Interoperability for Microwave Access), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realized using the internet rather than, or in addition to, an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as WI-FI) such as, for example, the IEEE 802.11a, 802.11b and/or 802.11g standards. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly, as shown by the broken line in FIG. 1, (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange, IBM Lotus Domino, or Novell GroupWise email server), a content server 134 for providing content such as internet content or content from an organization's internal servers, and application servers 136 for implementing server-based applications such as instant messaging (IM) applications to mobile communication devices 201.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132 or application servers 136. Conversely, the wireless connector system 120 sends data packets received, for example, from the messaging server 132 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132 and application server 136.

The network 124 may comprise a private local area network, metropolitan area network, wide area network, the public internet or combinations thereof and may include virtual networks constructed using any of these, alone, or in combination.

A mobile communication device 102 may alternatively connect to the wireless connector system 120 using a computer 117, such as desktop or notebook computer, via the network 124. A link 106 may be provided for exchanging information between the mobile communication device 201 and a computer 117 connected to the wireless connector system 120. The link 106 may comprise one or both of a physical interface and short-range wireless communication interface. The physical interface may comprise one or combinations of an Ethernet connection, Universal Serial Bus (USB) connection, FIREWIRE (also known as an IEEE 1394 interface) connection, or other serial data connection, via respective ports or interfaces of the mobile communication device 201 and computer 117. The short-range wireless communication interface may be a personal area network (PAN) interface. A Personal Area Network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the BLUETOOTH special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. Suitable variations of the communication system will be understood to a person of skill in the art and are intended to fall within the scope of the present disclosure.

Figure 2:
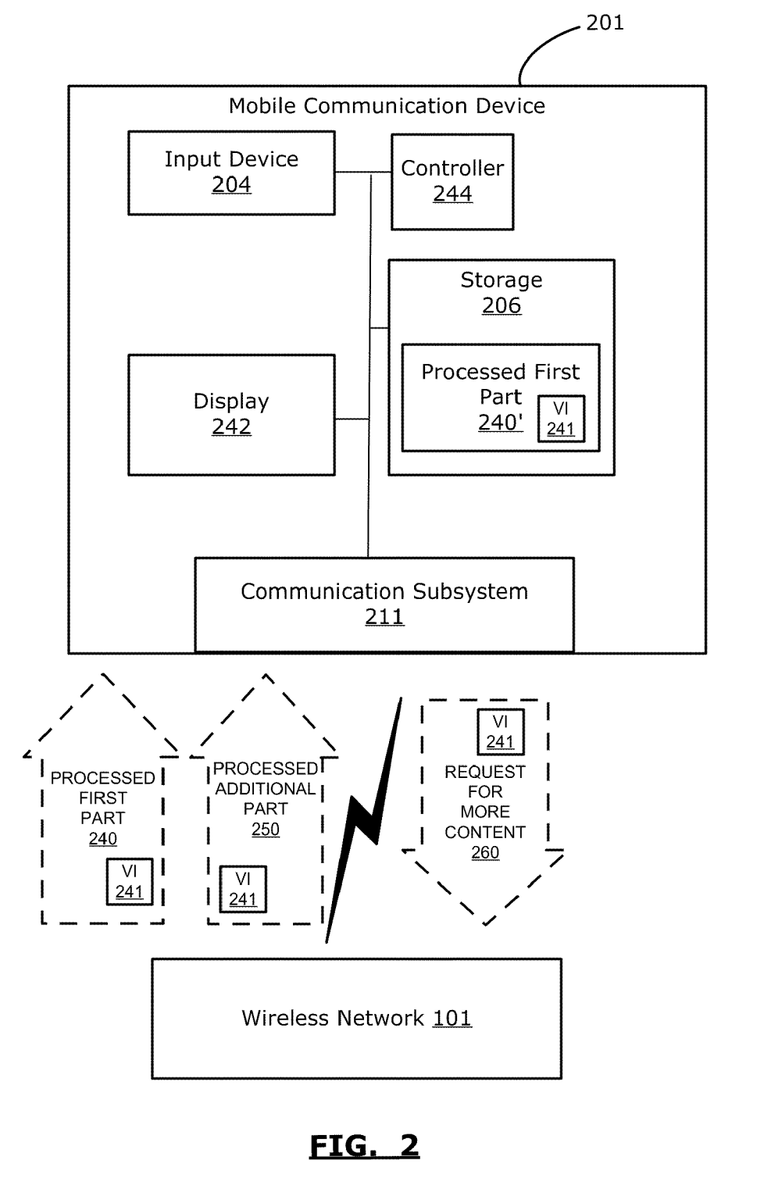
FIG. 2 is a block diagram illustrating a wireless connector system in accordance with one embodiment of the present disclosure.

Reference is now made to FIG. 2 which illustrates, in block diagram form, a mobile communication device 201 in which example embodiments described in the present disclosure can be applied. In the example embodiment, the mobile communication device 201 is a two-way communication device having at least data and possibly also voice communication capabilities, and the capability to communicate with other computer systems, for example, via the public internet. Depending on the functionality provided by the mobile communication device 201, in various embodiments the device may be, by way of example but not limitation, a data communication device, a multiple-mode communication device configured for both data and voice communication, a mobile telephone, a PDA (personal digital assistant) enabled for wireless communication, a smart phone, or a laptop computer with a wireless modem.

In some embodiments, the mobile communication device 201 is a handheld electronic device which includes a rigid case (not shown) for housing components of the device 201 and is configured to be held with one or two hands while the device 201 is in use. In some embodiments, the handheld electronic device is small enough to fit inside a purse or coat pocket or belt mounted holster.

The mobile communication device 201 includes a wireless communication subsystem 211 for exchanging radio frequency signals in the wireless network 101. The wireless communication subsystem 211 comprises at least one of a WAN communication subsystem for two-way communication with the WWAN 102 and a WLAN communication subsystem for two-way communication with the WLAN 104 via the access points 114. As will be appreciated by one skilled in the art, the wireless communication subsystem 211 includes a receiver, a transmitter, and associated components, such as one or more antenna elements, local oscillators (LOs), and a processing module such as a digital signal processor (DSP). The antenna elements may be embedded or internal to the mobile communication device 201 and a single antenna may be shared by both receiver and transmitter, as is known in the art. As will be apparent to those skilled in the field of communication, the particular design of the wireless communication subsystem 211 depends on the wireless network 101 in which mobile communication device 201 is intended to operate.

The mobile communication device 201 may communicate with any one of a plurality of fixed transceiver base stations 108 of the wireless network 101 within its geographic coverage area. The mobile communication device 201 may send and receive communication signals over the wireless network 101 after the required network registration or activation procedures have been completed.

The mobile communication device 201 includes a controller 244 which controls the overall operation of the mobile communication device 201. The controller 244 interacts with the communication subsystem 211 which performs communication functions. The controller 244 may be implemented by way of one or more suitably programmed microprocessors.

The controller 244 also interacts with additional device subsystems which may include but are not limited to a display device 242, input devices 204 and a storage 206. The display device 242 may be, for example, a liquid crystal display (LCD) screen. The input device 204 may be, for example, a keyboard or keypad, or a navigational device such as a clickable scroll wheel (also referred to as a track wheel or thumbwheel) or trackball. The keypad may be a complete alphanumeric keypad, or may be a limited, reduced, or simplified alphanumeric keypad such as a telephone-type keypad. In some embodiments, the input device 204 and the display device 242 may be implemented using a touch screen display which includes a touch-sensitive input surface which overlays the display device 242.

The storage 206 of the mobile communication device 201 may include, for example, one or more of a random access memory (RAM), read only memory (ROM), a hard disk drive (HDD), or other type of digital data storage. The storage 206 may be used to store data that is local to the mobile electronic device such as email messages 364 or parts 240, 250 of email messages. In some embodiments, the storage 206 is a memory having a location of memory reserved for storing email messages 364 or parts 240, 250 of email messages. While the storage 206 is shown as a single block in FIG. 2, it will be appreciated that the storage 206 may include a plurality of memory devices, such as, for example ROM, RAM and/or a HDD.

The storage 206 of the mobile communication device 201 may also store other data such as service data comprising information required by the mobile communication device 201 to establish and maintain communication with the wireless network 101 (for example, network service data and gateway service data). The storage 206 of the mobile communication device 201 may also store user application data such as email messages, address book and contact information, calendar and schedule information, notepad documents, image files, or other commonly stored user information. The data stored in the storage 206 of the mobile communication device 201 may be organized, at least partially, into a number of databases each containing data items of the same data type or associated with the same application. For example, email messages, contact records, and task items may be stored in individual databases within the device memory.

The controller 244 operates under stored program control and executes software modules stored in the storage 206. The software modules may comprise operating system software and software applications. Those skilled in the art will appreciate that the software modules or parts thereof may be temporarily loaded into volatile memory such as RAM of the storage 206. The RAM is used for storing runtime data variables and other types of data or information, as will be apparent to those skilled in the art. Although specific functions are described for various types of memory, this is merely an example, and those skilled in the art will appreciate that a different assignment of functions to types of memory could also be used.

The software applications may include a range of applications, including, for example, an address book application, a messaging application, a calendar application, and/or a notepad application. In some embodiments, the software applications includes one or more of a Web browser application (i.e., for a Web-enabled mobile communication device), an email message application, a push content viewing application, a voice communication (i.e. telephony) application, a map application, and a media player application. Each of the software applications may include layout information defining the placement of particular fields and graphic elements (e.g. text fields, input fields, icons, etc.) in the user interface (i.e. the display device 242) according to the application.

It will be appreciated that the mobile communication device 201 includes some additional elements which are not shown in FIG. 2 but are well known in the art. For example, the mobile communication device 201 includes a power source, which is typically one or more rechargeable batteries that may be charged, for example, through charging circuitry coupled to a battery interface. The battery provides electrical power to at least some of the electrical circuitry in the mobile communication device 201 and the battery interface provides a mechanical and electrical connection for the battery.

Figure 3:
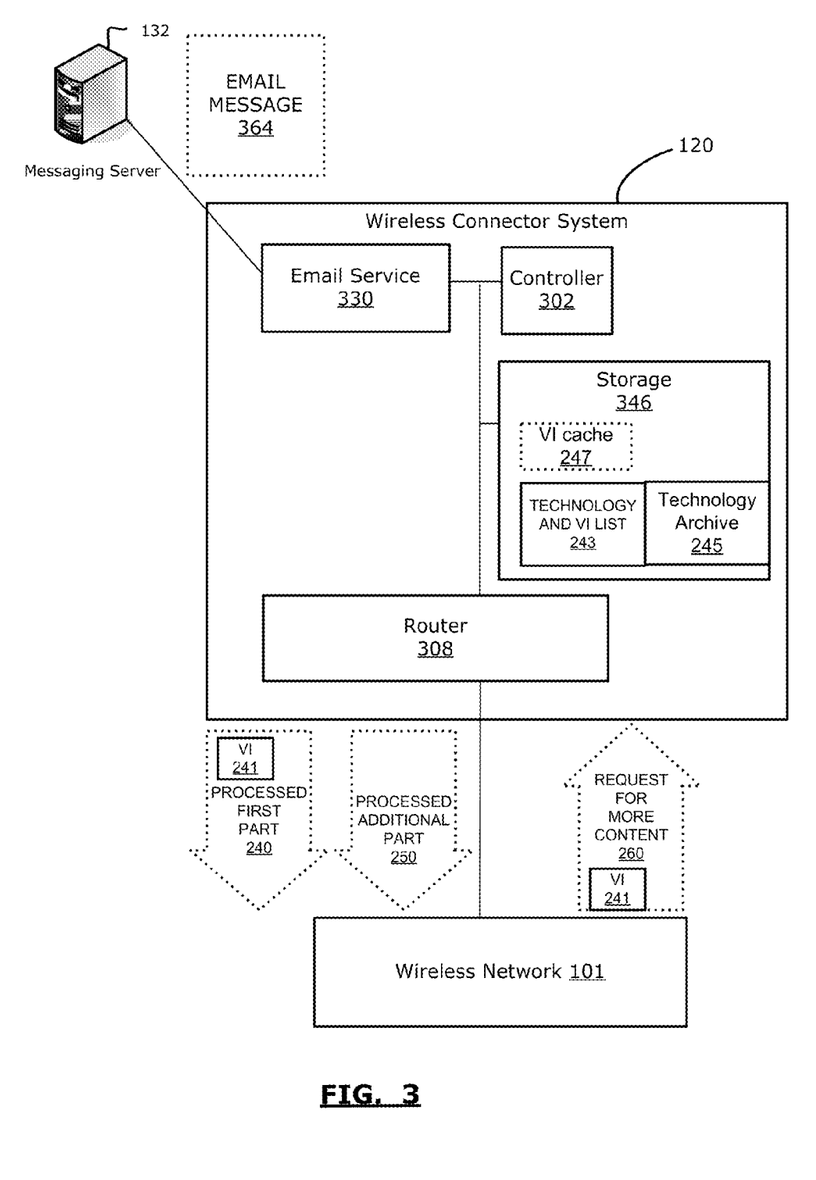
FIG. 3 is a block diagram illustrating a mobile communication device for use in accordance with one embodiment of the present disclosure.

Referring now to FIG. 3, the wireless connector system 120 for use in accordance with one embodiment of the present disclosure will now be described in more detail. The wireless connector system 120 may be implemented using any known general purpose computer technology, and may, for example, be realized as one or more microprocessor-based server computers implementing one or more server applications configured for performing the processes and functions described herein. The wireless connector system 120 is configured to implement a number of components or modules, including by way of non-limiting example, a controller 302, a router 308 and an email service 330. The wireless connector system may include more of or fewer than the modules listed above. In one example embodiment, the wireless connector system 120 includes one or more microprocessors that operate under stored program control and execute software to implement these modules. The software may for example be stored in memory such as persistent memory.

The controller 302 monitors the various components or modules of the wireless connector system and restarts them if they stop working. Router 308 connects to the wireless network 101 to send data to and receive data from mobile communication devices 201. Email service 330 connects to messaging server 132 to provide messaging services, including processing email messages 364 that are sent to mobile communication devices 201.

The controller 302, email service 330, and router 308 modules may, among other things, each be implemented through stand-alone software applications, or combined together in one or more software applications, or as part of another software application. In some embodiments, the functions performed by each of the above identified modules may be realized as a plurality of independent elements, rather than a single integrated element, and any one or more of these elements may be implemented as parts of other software applications.

Together with the other modules described above, the email service 330 configures the wireless connector system 120 to perform, at least in part, the functions of a mobile email server and in this regard the wireless connector system 120 receives email messages 364 from messaging server 132, processes the received email messages for sending to mobile communication devices 201 in wireless network 101, and then sends the processed email messages to the recipient devices 201.

In some circumstances, the file size of email messages may be quite large. The file size of email messages may become increasingly large as the use of HTML formatted email messages becomes increasingly popular since HTML emails can include markup describing how the contents of the email should be formatted when they are displayed. HTML content included in the body of an email message can also include reference to one or more attachments that contain data for displayable inline content such as an image, with the expectation that the attachment or attachments will be sent with the HTML email message so the inline content can be viewed at a receiving device.

Large email messages require a relatively large amount of bandwidth to transmit and a relatively large amount of storage on receiving devices to store the messages. In order to manage the resources used for large emails, portions of a large email can be selectively extracted and sent to a receiving mobile communications device, with the device user being presented with an option to then receive additional content from the email if desired.

As will be explained in greater detail below, methods and systems are described herein for managing email communications when an email is broken up into multiple parts for sending to a mobile communications device, particularly when there is a change in the processing environment between the time an original email portion is sent and additional content for the email is sent.

In some circumstances, the methods and systems described herein can be applied to email messages that are coded using a formatting language such as HTML. The current HTML specification is 4.01; however the present disclosure is not limited to any particular version and is intended to cover all prior and future versions, revisions, supplements, additions and replacements to the HTML specification to the extent they are compatible with the teachings of the present disclosure. Moreover, the descriptions of embodiments employing HTML is intended to serve as non-limiting examples, and the methods and systems described herein can in various embodiments be applied as well to non-HTML email messages, including plain text email messages and email messages that use formatting languages other than HTML, including but not limited to WML, XML, RTF, and other similar formatting and mark-up languages.

Figure 4:
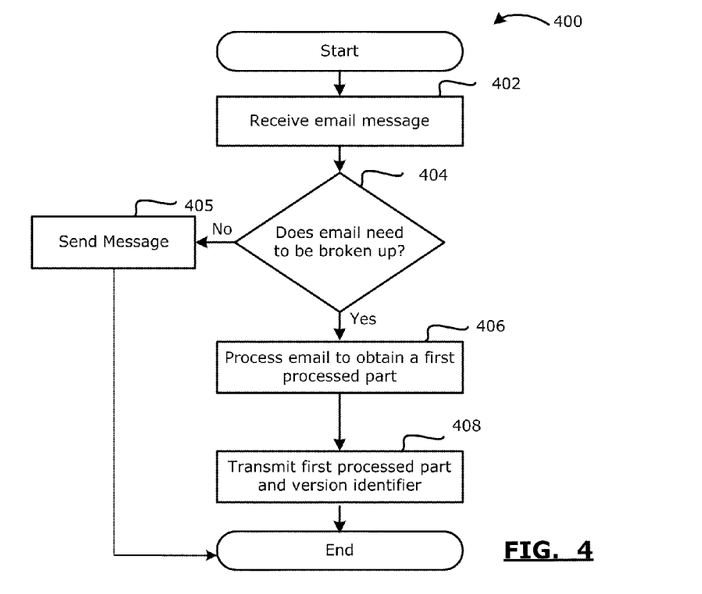
FIG. 4 is a flowchart illustrating a process for sending a first part of an email message in accordance with one example embodiment of the present disclosure.
Figure 5:
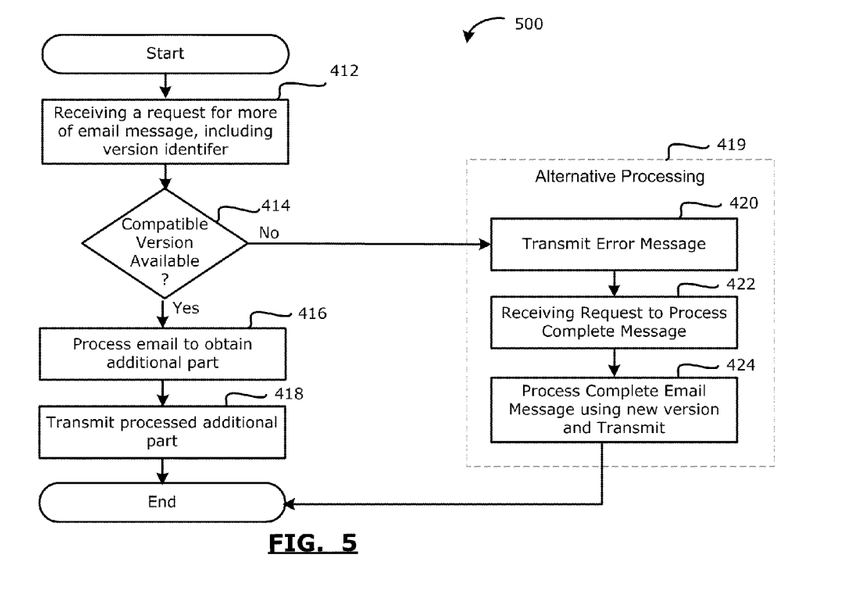
FIG. 5 is a flowchart illustrating a process for sending an additional part of an email message in response in accordance with one example embodiment of the present disclosure.

An overview having been provided, reference is now made to FIG. 4 and FIG. 5 which illustrate operations 400 and 500 respectively for managing delivery of multiple parts of an email message to a mobile communication device 201 in accordance with one embodiment of the present disclosure. The operations 400 and 500 may be performed by the email service 330 of the wireless connector system 120. In other embodiments, the operations 400 may be performed by a separate server connected to the wireless connector system 120.

In a first step 402, an email message 364 (see FIG. 3) intended for one or more mobile communication device 201 is received by the wireless connector system 120. The email message 364 may be an HTML email message or other type of formatted email message or a plain text message. The email message 364 is typically received from a messaging server 132, which, in turn, may have received the email message from an email client or from another messaging server or mail transport agent, such as another messaging server (not shown) or an SMTP server (not shown), any of which may be internal or external to network 124. By way of non-limiting example, messaging server 132 may be realized using MICROSOFT EXCHANGE messaging server software on a commercially-available computer system, and the email client may be realized using Personal Information Management (PIM) application software, such as MICROSOFT OUTLOOK email client software running on a commercially-available computer system. However, other messaging server and email client software could also be used. The email message 364 may, for example, have originated from a computer or mobile communication device 201 connected to the transport facilities 112 (such as the public internet) or to the network 124.

In a second step 404 a preliminary screening determination is made whether the email message 364 is large enough that it needs to be broken up for sending to a mobile communications device 201. By way of example, the determination may be based on whether the mail message has a size that is greater than a predetermined threshold. The predetermined threshold may be set by a system administrator and may be stored in the storage 206 of the mobile communication device. In some embodiments, the determination may be made based on a total email message file size. For example, in the case of an HTML email message that includes references or links to attachment files that provide content for inline data, the size of the HTML message content as well as the attachment files referenced for inline content may be considered when determining if the threshold is reached. In some circumstances, the threshold may be based on the amount of specific content (for example, a displayable text count or total displayable and non displayable character count) within an email message and include examining the displayable contents of the email message 364. In some embodiments the determination may be made on the size of the contents of the email message alone itself, ignoring any attachments to the email message 364. In some embodiments, there may be more than one threshold applied to determine whether an email should be broken up, each threshold relating to emails of a different format. For example, a first threshold may be used to determine whether HTML emails should be split into multiple parts and a second threshold may be used for determining whether plain text emails should be split into parts. In such situations, the first threshold, which is used for HTML emails is typically larger than the second threshold which is used for plain text emails in order to accommodate markup which is present in HTML emails and which includes formatting and layout information for the email contents. Due to the markup, a portion of an HTML email of a given size typically has less displayable content than a portion of a plain text email of the same size. Accordingly, in some embodiments different thresholds may be used to increase the likelihood that the first part will contain enough content to allow a decision to be made as to whether additional parts should be requested.

If the email message 364 has a size that is less than the predetermined threshold, the email message 364 may be transmitted to the mobile communication device at step 405. The complete email message may be processed in some way prior to transmission to modify, compress, or otherwise alter the content of the email message 364.

If, however, the email message 364 is large enough that it must be broken up, the email message 364 may be processed according to a first processing method at step 406. According to the first processing method, part of the email message 364 is selectively extracted to provide a processed first email message part 240 (see FIG. 3) for sending to mobile communications device.

In addition to extracting the first email message part 240, the processing performed in step 406 may, for example, include steps of modifying, compressing, converting or otherwise altering the extracted portion of the email message so that the resulting email message first part 240 is either placed in a format that makes it more suitable for transmission through the wireless network 101 or a format that makes it more suitable for one or more of storage, processing or display by a receiving mobile communications device 201, or both. In example embodiments, the amount of content that is extracted from email message 364 is selected so that the resulting email message first part 240 meets one or more threshold size limitations. that may, for example be set by a system administrator. In some embodiments threshold size limitations may relate to (i) total message size, for example the total size in bytes of email message first part 240 and any attachment files that are to be sent with it, or (ii) size or amount of specific content within the email message (for example a total number of specific content such as text characters within the file), or combinations thereof. The threshold file size limitation applied to first message part 240 may in some embodiments be the same threshold that is used at step 404 to determine whether the email message 364 is of a size that is greater than a predetermined threshold and is, therefore, an appropriate email for splitting into multiple parts. In other embodiments, different values may be used for the threshold at processing step 404 and the fixed, predetermined size at preliminary screening step 406. Furthermore, in processing step 404, the fixed, predetermined size may be selected to provide a part of an email message to a user that is of a sufficient length that it is expected to include sufficient content to permit the user to determine whether they would like to obtain the complete email message. In some embodiments, there may be more than one fixed, predetermined size, each relating to emails of a different format. For example, a first size may be used for processing HTML emails and a second size may be used for processing plain text emails. In such situations, the first size, which is used for processing HTML emails may be larger than the second size which is used for processing plain text emails in order to accommodate markup which is present in HTML emails and which includes formatting and layout information for the email contents, as well as optional attachments for inline content.

In an example embodiment, as part of processing step 406, Message Data that provides information about the processed email message first part 240 is inserted into a header or other part of the processed email message first part 240. Included in the Message Data is a unique message ID that can be used to identify the original email message 364, and Message Extraction Information that identifies what content from the original email message 364 has been included in the processed email message first part 240. For example, the message extraction information could include offset and length information that can subsequently be applied, in the event of a request for more content, to the original email message 364 to determine what was extracted from the message body to provide processed email message first part 240. The Message Data may also include size information about one or both of the email message 364 or processed email message first part 240 such as, for example, size information indicating what portion of the original email message 364 was not extracted from the message body and is not included in the processed email message first part 240. The size information may describe the size of the un-included message parts using a variety of metrics. For example, the length of the additional parts in characters, the number of lines of the additional parts, or the overall size of the additional parts in bytes.

As noted above, in addition to extracting the first email message part 240, the processing performed in step 406 may include a number of other processing functions including modifying, compressing, converting or otherwise altering the extracted portion of the email message into a format more suitable for one or both of the wireless network 101 or the mobile communication device 201. These processing functions performed by the email service 330 or by applications called by the email service 330 can be done by one or more different software programs or modules that include program code and that may occasionally be upgraded or otherwise replaced. In one example embodiment, the email service 330 either maintains or has access to a stored list 243 (FIG. 3) that is stored in a storage element 346 and that identifies all or at least some of the technologies (such as program code or software modules, for example) currently used in processing step 406, as well as the version identities for the current versions of such technologies. Storage 346 may for example be storage that is part of a server on which the wireless connector system 120 is implemented, including for example RAM, a hard disk, flash memory or other digital storage drive. The technology and version identification (VI) list 243 could also be stored at other locations accessible to email service 330. The technology and version identification list 243 is updated whenever a technology upgrade occurs so that it reflects the current processing applied by step 406. In some example embodiments, sometimes after an upgrade occurs to the processing technologies, the program code or software modules for previous versions may for at least some time be saved either in a technology archive 245 that is stored in local storage element 346 or alternatively at another storage location accessible to email service 330. In some example embodiments, the technology and version identifier list 243 will also store a list of previous technology versions that are currently available to the email service 330 and provide linking information for such previous technology versions.

As part of processing step 406, version identification data (VI) 241 (FIG. 3) is created based on the technology and version identification list 243 such that the version identification data (VI) 241 identifies one or more of the processes that were applied in step 406 and the current version information for those processes. Thus, the version identification data 241 contains information about the technologies and versions of technologies used to process the original email message 364 to derive the processed email message first part 240. The version identification data (VI) 241 is added to the first email message part 240, for example by including it with the Message Data discussed above.

Next at step 408, the processed first email message part 240 of the email message 364, including the version identification data 241, is sent to a recipient mobile communication device 201, and message sending operations 400 is completed.

Referring now to FIG. 2, the mobile communication device 201 that receives the first email message part 240 is configured to store in on-device storage 206 a representation 240' of the first email message part 240, which includes the Message Data and version identification data (VI) 241, and display the processed first part 240 of the email message on the display device 242 upon request by the user. Where additional information is available in the Message Data which will permit the user to make a more informed decision about whether to obtain additional parts, such as the size information indicating the size of the additional parts, such information may also be displayed on the display device 242 in some example embodiments. In some example embodiments, the version identification data (VI) 241 is transparent to the receiving mobile communications device 201 and is effectively treated as a cookie that is stored locally on the device to provide information back to the wireless connector system 120 as indicated below.

In an example embodiment, the mobile communication device 201 is configured to permit the user to request additional content from the email message 364. To do so, the user typically manipulates the input device 204 in a predetermined sequence. For example, the user may be required to simply press an appropriate button on the keypad to obtain additional parts. The user may be given an option to request all of the remaining message, or just to request up to a threshold additional part of the remaining message. As indicated in FIGS. 2 and 3, when a request for more content is made, the mobile communication device 201 sends a request message 260 through wireless network to the wireless connector system 120. The mobile communications device 201 is configured to include, in addition to its own identity, all or some of the Message Data in the request message 260, including the unique message ID, Message Extraction Information, and the version identification data (VI) 241. The request message 260 may in some example embodiments also indicate if the request is being made for all of the remainder of the email message content or just a further additional portion of it.

FIG. 5, illustrates an example of operations 500 that can be performed by the email service 330 when a request for additional content is received from a mobile communications device. As indicated at step 412, at some time after the transmission of the processed first email message part 240 of the email message 364, a request in the form of request message 260 (including version identification data (VI) 241) may be received to transmit more content from the email message 364 to the mobile communication device 201.

It will be appreciated that in the time lag between sending of the processed email message first part 240 and the receipt back of the request for additional content message 260, an upgrade or change in one or more of the technologies used by the email service 330 may have occurred. Such change could affect the proper processing of the request for additional content—for example, length and offset information included in the Message Extraction Information sent with the request message 260 might not be compatible with the information that is used in an upgraded extraction process that is now being applied by the current processing technology used by the email service 330.

As one or more of the various technologies used in the email processing of step 406 are identified in the version identification data (VI) 241 that was included in the request message 260, the request message 260 includes information that the email service 330 can use to determine what processes and the version levels of those processes were originally applied when the email message 364 was processed by operations 400 to create processed email message first part 240.

Accordingly, at step 414, the email service 330 extracts the version identification data (VI) 241 from the request message 260 and compares that data with the information contained in its own technology and version identification list 243 to determine if the email message 364 for which the request for additional content is being made was originally processed in processing step 406 with technology that (i) corresponds to the current version of the processing technology being applied in processing step 406 or (ii) corresponds to a previous version of the processing technology that is accessible to the email service 330 in the technology archive 245 or another storage location accessible to email service 330 or (iii) corresponds to a previous version of the processing technology is that is not available. (Note that in some embodiments, archive 245 may not be provided and prior technology versions may not be available such that determination step 412 only has options (i) or (iii)). In the case of either (i) or (ii), a determination is made that a compatible version of the processing technology is available and the email service 330 proceeds with processing the request for additional content as will be discussed further below.

However, in the event that a determination is made that the email message 364 for which the request for additional content is being made was originally processed in processing step 406 with technology that (iii) corresponds to a previous version of the processing technology is that is not available, then alternative processing steps 419 are performed. In the example shown in FIG. 5, the alternative processing steps 419 include a number of steps. First, at step 420, an error message is transmitted to the mobile communication device. The error message includes the unique message ID to permit the mobile communication device 201 to associate the error with the appropriate email message or part thereof. The mobile communication device 201 receives the error message and may present the user with an option via the display device 242 to re-process the complete email message 264 from the beginning. The user may request that the complete email message 364 be reprocessed using the second processing method defined in the second computer code. To make such a request, the user may manipulate the input device 204 according to a predefined input sequence.

If the user elects to reprocess the email message 364 using the second processing method, the mobile communication device 201 transmits a request to process the complete email message. The request includes identification information, such as the unique message ID, which allows the wireless connector system 120 to associate the request with the appropriate email message 364. The request may be received at the wireless connector system 120 at step 422. If such a request is received, at step 424, the mobile communication device may process the complete email message 364 using the current processing technology version to produce a processed email message for the entire email message. The processed email message may then be sent to the mobile communication device 201.

Other alternative methods 419 may also be used if a compatible technology version is not available at step 414. In one embodiment, the wireless connector system 120 may simply transmit an error message to the mobile communication device 201. In another embodiment, the steps 420, 422 of transmitting and error message and waiting for a request in response may both be omitted such that if the compatible technology version is not available, the entire email message 364 will automatically be reprocessed using the new version. In this embodiment, the user of the mobile communication device 201 is not presented with a choice as to whether the entire email should be reprocessed; reprocessing is performed automatically if a compatible version is not available, and the email message sent with a flag or other marker to indicate to the mobile communications device 201 that the new message replaces the previously received first part 240.

Turning again to step 414, if a determination is made in such step that the email message 364 for which the request for additional content is being made was originally processed in processing step 406 with technology that (i) corresponds to the current version of the processing technology or (ii) corresponds to a previous version of the processing technology that is accessible to the email service 330, then as indicated at step 416 the corresponding email message 364 is processed to obtain the additional content that has been requested. As noted above, in some embodiments the request message 260 can simply be a request for all of the unsent email message content (in the case of an HTML message, for example, that may include all remaining information contained in the email message body and any attachments linked for providing inline content for the email message), in which case the entire remaining unsent portion of the email message 364 can be processed in step 416. As noted above, in some example embodiments, the request message 260 may be a request for only an additional part of the previously unsent content, in which case the processing in step 415 will be limited accordingly.

The processing performed on the unsent email content in step 416 can be similar to that described above in respect of processing step 406 to produce a processed additional email part 250 (see FIG. 3). For example, the previously unsent content can be processed with the same processing technology version used to process the email message 364 originally in step 406—which will be the current processing technology version in the case where the originally used processing technology corresponds to the current version of the processing technology or which will be a previous processing technology version where originally used processing technology corresponds to a previous version of the processing technology that is accessible to the email service 330.

When performing additional content processing step 416, the email service 330 will generally need to access a copy of the original email message 364, which may be done by using a retrieving a stored copy of the email message from an in-memory message cache if available, or alternatively, retrieving the original email message 364 from a remote location such as messaging server 132.

Next, at step 418, the processed additional part 250 is transmitted to the mobile communication device 201. The processed additional part 250 includes the unique message ID, as well as Message Extraction Information, permitting the mobile communication device 201 to associate the additional part 250 with the appropriate email message 364 or part 240 thereof. The mobile communication device 201 may combine the parts 240, 250 of the email and permit the user to view the contents of the combined message. At least in situations where less than all of the previously unsent content was included in the additional email part 250, the version identifier data 241 may be included in the additional message part 250 such that operations 500 can be repeated for any subsequent requests for additional content.

In some embodiments, the user is not involved in each request 260 for additional parts at step 412. The request 260 for additional parts may be made by the mobile communication device 201 without the need for user interaction to transmit each request 260. For example, the mobile communication device 201 may be programmed with a set of preferences or rules which dictate the circumstances under which a request 260 will be sent for additional parts. The preferences or rules may be set by the user, an administrator, or by a device manufacturer. For example, the user may program a rule that all additional parts of the email message will be obtained whenever additional parts are available. Such a rule may be desirable for a user having an unlimited data plan in which the cost of transmitting data is fixed regardless of the quantity of data transmitted. In other embodiments, the mobile communication device 201 may include a rule that specifies that additional parts will automatically be requested where they are less than a specific size.

It some circumstances where a technology upgrade has occurred, there may be no compatibility issues between the old and new versions—in such situations the version identification list 243 may not be updated, or alternatively may include compatibility information that identifies what versions are compatible. Such compatibility information could be used in step 416 when determining if a compatible processing technology is currently being used or is available.

Figure 6:
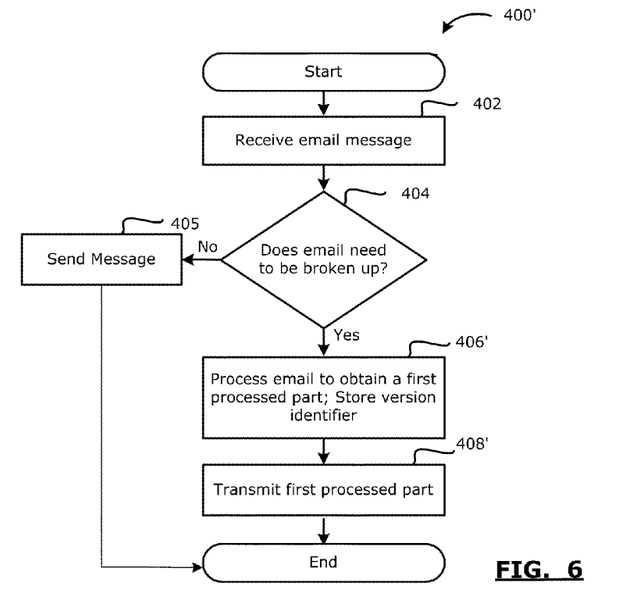
FIG. 6 is a flowchart illustrating a process for sending a first part of an email message in accordance with another example embodiment of the present disclosure.
Figure 7:
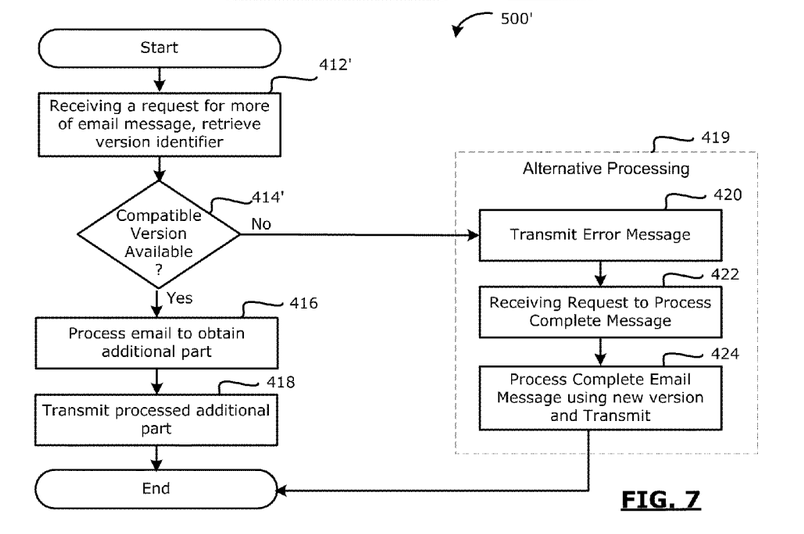
FIG. 7 is a flowchart illustrating a process for sending an additional part of an email message in response in accordance with another example embodiment of the present disclosure.

Other methods of tracking the methods or technology versions used to obtain the processed first part 240 of the email message 264 apart from that shown in FIG. 4 and FIG. 5 and described above may also be used. For example, alternative message sending operations 400' and 500' are shown in FIGS. 6 and 7 that are similar to operations 400 and 500 shown in FIGS. 4 and 5 except for differences that will be apparent from the Figures and the following description. In operation 400', processing step 406' is similar to processing step 406 of operations 400 except that instead of inserting the version identification (VI) data 241 into the first message part 240, such information is stored together with the corresponding unique message ID and Message Extraction Information in a version identification cache 247 (FIG. 3) in storage element 346 or in a storage location otherwise accessible to email service 330. In this embodiment, version identification information does not have to be transmitted to the mobile communication device 201 at step 408' or received from the mobile communication device 201 in step 412 since the version identification information is stored in the storage element 346. At step 414', the version identification information may be retrieved from the storage element 346 to make the compatibility determination.

In some example embodiments, the operations 400 and 500 or 400' and 500' are called by part of a larger email processing operation each time the wireless connector system 120 processes an email message.

It will be thus appreciated that in at least some example embodiments, email service 330 operates such that when the wireless connector system 120 is required to send an email message to a recipient, the email message may be broken into parts. A first part may be processed according to using a first processing version and transmitted to the mobile communication device 201. Information about the first processing version used to process the first part is recorded, for example, by sending such information to the mobile device, or by storing it in storage element 346 of the wireless connector system 120. If additional parts are requested, those parts are processed according to a processing version that corresponds to the first processing version and the resulting processed additional part transmitted to the mobile communication device 201. Since the processing versions used to produce the processed additional part 250 corresponds to that used to produce the processed first part 240, the processed additional part 250 is compatible with the processed first part 240.

A method, server and system for managing the delivery of email messages in multiple parts is provided. According to one example embodiment a method for sending email messages in multiple parts to a mobile communication device comprises receiving at a wireless connector system a request for additional content from a mobile communication device in respect of an email message for which a selected part of the content has been previously sent to the mobile communications device; and determining if processing technology used to provide the previously sent selected part is compatible with processing technology currently available on the wireless connector system, and if compatible then processing additional content from the email message using the currently available processing technology and sending the processed additional content to the mobile communication device.

According to another example embodiment, the disclosure provides a a wireless connector system for processing and forwarding email messages to mobile communications devices located within a wireless network. The wireless connector system is configured for: i) receiving at the wireless connector system a request for additional content from a mobile communication device in respect of an email message for which a selected part of the content has been previously sent to the mobile communications device; ii) determining if processing technology used to provide the previously sent selected part is compatible with processing technology currently available on the wireless connector system; and iii) if compatible then processing additional content from the email message using the currently available processing technology and sending the processed additional content to the mobile communication device.

In yet a further aspect, the present disclosure provides a system for managing the delivery of email messages. The system includes a wireless connector system for processing and forwarding email messages to mobile communications devices located within a wireless network. The wireless connector system is configured for: i) receiving at the wireless connector system a request for additional content in respect of an email message for which a selected part of the content has been previously sent; ii) determining if processing technology used to provide the previously sent selected part is compatible with processing technology currently available on the wireless connector system; and iii) if compatible then processing additional content from the email message using the currently available processing technology and sending the processed additional content. The system also includes a mobile communication device which is configured to: i) send a request for additional content to the wireless connector system; and ii) receive the processed additional content from the wireless connector system if the processing technology used to provide the previously sent selected part is compatible with processing technology currently available on the wireless connector system.

According to an example embodiment, this disclosure provides a method for transmitting email messages in multiple parts to a mobile communication device, the method comprising: a) receiving a first email message; b) processing the first email message according to a first processing method to obtain a processed first part of the first email message and at least one additional part; c) sending the processed first part to a mobile communication device; d) tracking the method used to process the first email message; e) receiving a request for at least one additional part; f) processing the at least one additional part using a method corresponding to the tracked method to obtain at least one processed additional part; and g) sending the at least one processed additional part to the mobile communication device.

In accordance with further embodiments of the present disclosure, there are provided a computer program product comprising a computer readable medium having stored thereon computer executable instructions comprising instructions for practising the methods of the application.

While the present disclosure is primarily described as a method, a person of ordinary skill in the art will understand that the present disclosure is also directed to various apparatus such as a mobile communication device and wireless connector system for carrying out at least some of the aspects and features of the described methods and including components for performing at least some of the described method steps, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method for sending email messages in multiple parts from a wireless connector system to a mobile communication device, the method comprising:
receiving, at the wireless connector system, a request for additional content from a mobile communication device in respect of an email message for which a selected part of the content has been previously sent to the mobile communications device;
determining that processing technology used to provide the previously sent selected part is not compatible with processing technology currently available on the wireless connector system;
sending an indication of incompatibility to the mobile communication device;
receiving, from the mobile communication device, a request to reprocess the email message;
responsive to the receiving the request to reprocess, reprocessing the email message using the processing technology currently available to produce a reprocessed email message; and
sending the reprocessed email message to the mobile communication device.

2. The method of claim 1 further comprising:
prior to receiving the request for additional content, upgrading the email processing technology on the wireless connector system.

3. The method of claim 2, wherein upgrading the email processing technology on the wireless connector system comprises:
replacing the processing technology used to process email messages with a new processing technology; and
updating a technology version identification list in a storage to identify the new processing technology,
and wherein the determination as to whether processing technology used to provide the previously sent selected part is compatible with processing technology currently available on the wireless connector system is made based on the version identification list.

4. The method of claim 1, further comprising:
prior to receiving the request for additional content, sending the selected part to the mobile communication device together with technology version identification data indicating the processing technology used to provide the selected part,
and wherein the request for additional content includes the technology version identification data.

5. The method of claim 1, further comprising:
prior to receiving the request for additional content, sending the selected part to the mobile communication device together with a unique message identifier used to track the email message,
and wherein the request for additional content includes the unique message identifier.

6. The method of claim 1, further comprising:
prior to receiving the request for additional content, storing in a storage technology version identification data indicating the processing technology used to provide the selected part,
and wherein determining that the processing technology used to provide the previously selected part is not compatible comprises retrieving the technology version identification data in storage.

7. The method of claim 1, further comprising, prior to receiving the request for additional content:
receiving the email message at the wireless connector system;
processing the email message using a processing technology to obtain a selected part of the email message; and
sending the selected part of the processed email message to the mobile communication device.

8. A wireless connector system for processing and forwarding email messages to mobile communications devices located within a wireless network, the wireless connector system being configured for:
receiving, at the wireless connector system, a request for additional content from a mobile communication device in respect of an email message for which a selected part of the content has been previously sent to the mobile communications device;
determining that processing technology used to provide the previously sent selected part is not compatible with processing technology currently available on the wireless connector system; and
sending an indication of incompatibility to the mobile communication device;
receiving, from the mobile communication device, a request to reprocess the email message;
responsive to the receiving the request to reprocess, reprocessing the email message using the processing technology currently available to produce a reprocessed email message; and
sending the reprocessed email message to the mobile communication device.

9. The wireless connector system of claim 8 wherein the system is implemented on a server and the storage element is implemented in local in-memory storage of the server.

10. The wireless connector system of claim 8, wherein the wireless connector system is further configured for:
sending the selected part to the mobile communication device together with technology version identification data indicating the processing technology used to provide the selected part prior to receiving the request for additional content,
and wherein the request for additional content includes the technology version identification data.

11. A system for managing the delivery of email messages comprising:

a wireless connector system for processing and forwarding email messages to mobile communications devices located within a wireless network, the wireless connector system being configured for:
- receiving at the wireless connector system a request for additional content in respect of an email message for which a selected part of the content has been previously sent;
- determining if processing technology used to provide the previously sent selected part is compatible with processing technology currently available on the wireless connector system;
- sending an indication of incompatibility to the mobile communication device;
- receiving, from the mobile communication device, a request to reprocess the email message;
- responsive to the receiving the request to reprocess, reprocessing the email message using the processing technology currently available to produce a reprocessed email message; and
- sending the reprocessed email message to the mobile communication device; and a mobile communication device, wherein the mobile communication device is configured for:
- sending the request for additional content to the wireless connector system;
- receiving the indication of incompatibility from the wireless connector system;
- sending the request to reprocess the email message;
- sending the reprocessed email message to the mobile communication device; and
- receiving the reprocessed email message from the wireless connector system.

* * * * *